United States Patent

[11] 3,604,724

[72] Inventor Paul Corbin
 7737, rue St. Denis, Montreal, Quebec, Canada
[21] Appl. No. 837,760
[22] Filed June 30, 1969
[45] Patented Sept. 14, 1971

[54] AUTOMOBILE SUSPENSION
 7 Claims, 6 Drawing Figs.
[52] U.S. Cl. .................................................. 280/96.2, 280/124
[51] Int. Cl. ...................................................... B60g 11/64
[50] Field of Search ........................................... 280/112, 96.2, 124

[56] References Cited
 UNITED STATES PATENTS
 3,261,621 7/1966 Corbin .......................... 280/96.2
 3,408,888 10/1968 Corbin .......................... 280/96.2

Primary Examiner—Philip Goodman
Attorney—Raymond A. Robic

ABSTRACT: An automobile suspension having a body, a pair of uprights each on one side of the body with a wheel mounted thereon and supporting struts to which the front end of the body is suspended, the struts being inclined toward one another for the suspension of the body above the center of gravity thereof. The body has a frame that includes a radiator support yoke at the front end with a torsion rod assembly mounted at the top of the yoke. A pair of trailing arms are articulated at the rear end to the top of the supporting struts and operatively connected at the forward end to the top of the yoke. Two shock absorber units are connected respectively to the frame and to the trailing arms adjacent the supporting struts or, alternatively, directly to the top of the supporting struts. First articulated connections on one side of each strut join the top of the struts and the top of the corresponding uprights while second articulated connections on the sides of the struts opposite that of the first connections interconnect the lower end of the struts and the body at the bottom thereof.

PATENTED SEP 14 1971 3,604,724

INVENTOR
Paul CORBIN
BY
Raymond O. Corbin
ATTORNEY

INVENTOR
Paul CORBIN
BY
Raymond A. Robie
ATTORNEY

INVENTOR
Paul CORBIN

ATTORNEY

AUTOMOBILE SUSPENSION

BACKGROUND OF THE INVENTION

The present invention generally relates to automobile suspensions and is an improvement of the suspensions described and claimed in my prior Canadian Pat. No. 729,053 of Sept. 1, 1966, my prior U.S. Pats. No. 3,150,882 of Sept. 29, 1964, No. 3,261,621 of July 19, 1966 and my presently pending Canadian application Ser. No. 985,239 filed on Mar. 14, 1967.

As with the automobile suspensions disclosed in the aforesaid patents and application, the general object of the present invention is the provision of a suspension for the rocking of the body of an automobile, in a curve and away from the center of the curve an amount which is proportional to the centrifugal force developed by the automobile.

As compared to the mechanisms described in the aforementioned patents and application, the specific object of the invention lies in appreciably simplifying the suspension proper by the elimination of the subframe and corresponding parts, all components of the suspension being attached directly to the frame or chassis. The invention provides a simplified and improved manner of controlling the camber of the front wheels in a curve with the wheels staying substantially parallel to the rocking body. With the improvements of the invention, the new suspension may be installed on existing cars with an appropriate "kit of parts."

More specifically, the improvement of the invention broadly resides in the combination that comprises a body frame including a radiator support yoke at the front end of the frame with a transverse torsion rod assembly mounted at the top of the yoke. Trailing arms are articulated at the rear end to the top of the supporting struts and are operatively connected at the forward end to the top of the yoke. Shock absorber units are connected, respectively, to the frame and to the trailing arms adjacent the supporting struts or, alternatively, directly to the top of the supporting struts so that the load of the automobile body may be transferred to the top of the struts. Finally, means are provided to interconnect the struts and the uprights.

DESCRIPTION OF THE PREFERRED EMBODIMENT

Figure 1:
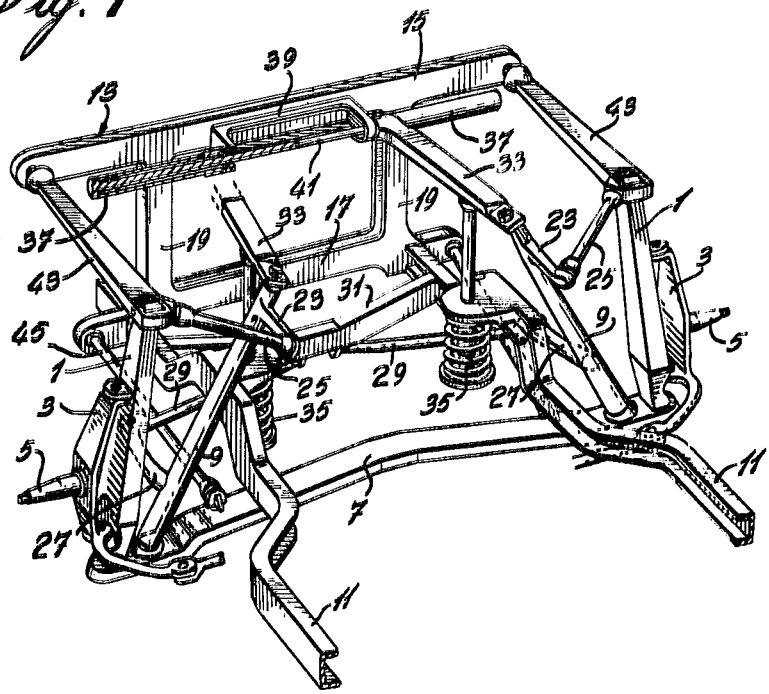
FIG. 1 is a perspective view of the front suspension of the automobile, looking forwardly.

The front wheel suspension comprises the usual pair of upstanding uprights 1 provided with steering knuckles 3 mounted for pivotal movement about axes generally parallel to uprights 1 and having laterally projecting stub shafts 5 located intermediate the ends of the uprights 1. It should however be pointed out that on newer automobile models, the steering knuckles 3 would be integral with the uprights 1 to thus form a single member.

Referring again to the drawings, the lower ends of the uprights 1 are articulated to, and interconnected by, an axle 7 to keep them at a predetermined distance from one another. Axle 7 may be curved forwardly to clear the motor but it may also be straight if clearance is adequate.

A pair of supporting struts 9 have the lower ends thereof articulated to the axle 7 adjacent the uprights 1 and for all practical purposes, it may be considered that they are articulated to the lower ends of uprights 1. As in previous cases and in conventional manner, the lower ends of uprights 1 are as low as is feasible.

In this specification and in the claims, by the term "articulation" should be understood the connection of two members together allowing limited universal relative movement, such as by means of a ball joint.

As will be more fully described hereinafter, the front end of the body is suspended to the top of the suspension struts 9.

The latter are inclined toward one another with the longitudinal axes thereof intersecting substantially in a vertical central longitudinal plane of the automobile body and the upper ends thereof are above the center of gravity of the body when the vehicle is at rest, whereby the forward end of said body may rock about a substantially central longitudinal axis when the automobile takes on a curve.

The aforementioned description is generally known. The improvement provided by the invention resides, in part, in the provision of means transferring the load of the front end of the body to the top of the suspension struts 9.

Before describing such transferring means in detail, it should first be pointed out that, in the drawings, the automobile body is diagrammatically illustrated for the sake of clearness and simplicity by lateral channels 11 that are parts of the frame or chassis and by an upstanding radiator support yoke 13, at the forward end of channels 11, formed of upper and lower crossmembers 15, 17 respectively interconnected by vertical risers 19.

In the preferred illustrated embodiment, the load transferring means previously mentioned comprises a pair of trailing or supporting arms 33 articulated at the rear ends to the top of supporting struts 9 and mounted at the forward ends to the top of the radiator support yoke 13 so that the said forward ends may rock about a transverse axis. The load transferring means additionally includes a pair of shock absorber units 35 (springs and/or shock absorbers) interconnected between the frame, more specifically the channels 11, and the trailing or supporting arms 33 adjacent the supporting struts 9 or connected directly to the top of the said supporting struts.

Figure 2:
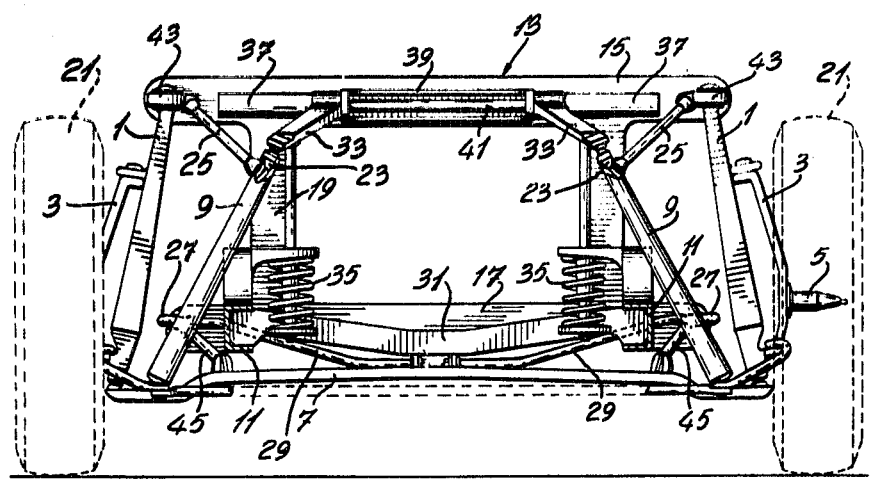
FIG. 2 is a transverse vertical cross-sectional view, again looking forwardly of the automobile.
Figure 3:
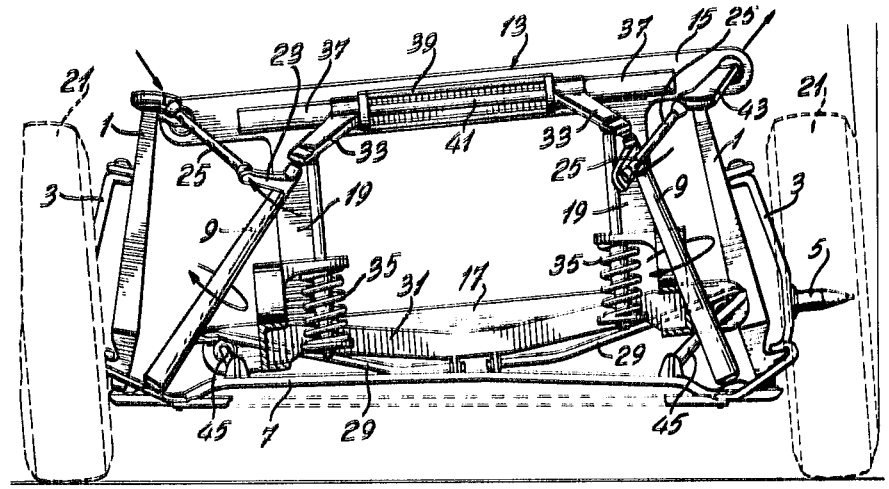
FIG. 3 is a view similar to that of FIG. 2, showing the suspension when the car takes on a left turn.
Figure 4:
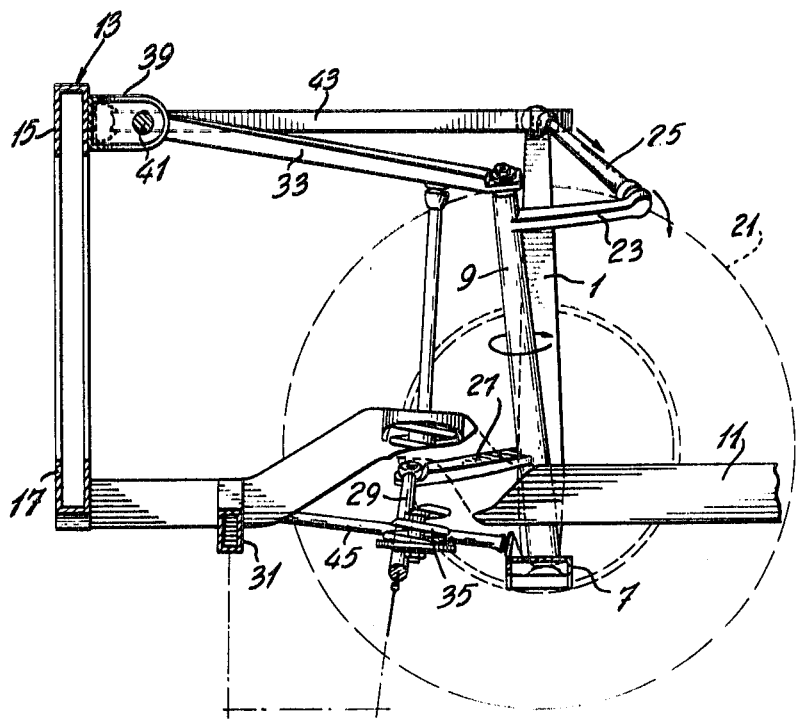
FIG. 4 is a longitudinal cross-sectional view of the front end suspension.

Preferably, the trailing arms 33 are operatively connected at the forward ends thereof to a transverse rod assembly such as illustrated in FIGS. 1, 2 and 3 and generally comprising a pair of tubes 37 rotatably mounted at one end on a U-shaped bracket 39 fixed to the top of the radiator support yoke 13, more specifically the crossmember 15, and outwardly laterally projecting from the flanges of channel bracket 39. The forward ends of the supporting arms 33 are made fast with the tubes 37 in the manner shown. A torsion rod 41 freely enters the tubes 37 and is made fast at the outer ends, with the bottom of tubes 37. In this manner, vertical oscillations of the whole frame or of one side thereof is absorbed both by the shock absorber units 35 and by the torsion rod assembly just described. In view of the suspension of the body above the center of gravity thereof, more weight is put on the inside wheel than is possible with a conventional suspension. Furthermore, part of the pressure applied on the outside wheel is transferred to the inside wheel through the aforedescribed torsion rod assembly. The latter will thus give lateral stability to the automobile while allowing independent movement of each wheel.

Longitudinal oscillation of the body frame is controlled by the provision of locating arms 43 connected, at one end, to the top of uprights 1 for pivotal movement about transverse axes to thus prevent rotation of uprights 1 about their own axes and to allow such rotation by steering knuckles 3. The other ends of locating arms 43 are articulated to the top of yoke 13 or more specifically the crossmember 15. Radius rods 45, articulated to axle 7 and to the lower crossmember 17 respectively are also provided to hold axle 7 in longitudinal position relative to the body.

The suspension of the invention also comprises a wheel banking mechanism corresponding to each supporting strut 9 to cause its rotation about its longitudinal axis, each mechanism to comprise a first articulated connection on one side of the strut 9 interconnecting the top of the strut and the top of the corresponding upright 1 as well as a second articulated connection on one side of the strut 9 opposite that of the first connection and interconnecting the lower end of the strut 9 and the body at the bottom thereof so that when the body rocks about the longitudinal axis thereof, the second articulated connections cause the struts 9 to rotate and the first articulated connections force the uprights 1 and wheels 21 to bank toward the center of the curve.

The first articulated connection aforementioned of each banking mechanism of the wheels 21, in the illustrated embodiment, more specifically comprises an upper banking lever 23 solid with and laterally projecting from the top of the corresponding strut 9 and an upper banking rod 25 articulated at one end to the free end of the banking lever 23 and also articulated at the other end to the top of the corresponding upright 1. As to the second articulated connection previously referred to and illustrated in the preferred embodiment, it comprises a lower banking lever 27 solid with and laterally projecting from the bottom of struts 9 but in a direction opposite that of the upper banking lever 23. This second articulated connection further comprises a lower banking rod 29 articulated at one end to the free end of the lower lever 27 and also articulated at the other end to the bottom of body 11 in the manner now to be described.

A further crossmember or strut 31 extends across the body frame, forwardly of axle 7, and is rigidly connected to the lateral channels 11 of the frame. The lower banking arms 29 are articulated as clearly illustrated in FIGS. 1, 2 and 3, to the center portion of this strut 31 in any conventional manner. As will be gathered from this description and the illustrated embodiment, the location of this articulation is substantially along the longitudinal centerline of the automobile body.

A description of the operation of the wheel banking mechanism as well as of the front wheel suspension will now be given with reference to FIGS. 1 to 4.

Assuming the automobile to take a leftward turn, the car body diagrammatically represented by the channels 11 and radiator support yoke 13 will sway to the right as shown in FIG. 3. Consequently, crossmember 31 will likewise sway to the right, drawing with it the lower banking rods 29, thus causing the supporting struts 1 on either side of the body to rotate clockwise. In consequence, the leftward upper banking lever 23 will move outwardly with respect to the center of the body causing, through rod 25, the corresponding upright 1 and wheel 21 to cant leftward. Likewise, the rightward banking lever 23 will move centerwise causing upright 1 through banking rod 25 to cant to the left, that is toward the center of the curve.

As is conventional, the improved automobile of the invention has a rear axle 47 (FIGS. 5 and 6) to which are operatively connected rear wheels 21'. The improvement of the invention preferably comprises a novel rear suspension for the body formed of a pair of struts 49 pivotally mounted on axle 47 through brackets 51, secured to axle 47, and inclined toward one another with the longitudinal axes thereof intersecting substantially in a vertical central longitudinal plane of the body and the upper ends thereof are above the center of gravity of the said body when the vehicle is at rest whereby the rear end of the body may rock about a substantially central longitudinal axis when the vehicle takes on a curve, in the same manner as the forward end of the body. The rear suspension further comprises supporting arms 53 pivoted at one end to the body represented, as aforesaid, by frame 11, and pivoted at the other end to the top of the supporting struts 49. Finally, a pair of resilient units 55 (springs and shock absorbers) is provided, one on each side of body 11 and connected to said body 11, on the one hand, and pivoted to the supporting arms 53, intermediate the ends thereof.

Pivotal axes of members 49, 53 to brackets 51 and body 11 as well as between members 49 and 53 are substantially parallel to the longitudinal axis of the body 11.

Longitudinal positioning of the axle 47 with respect to body 11 is obtained by a pair of radius rods 57 articulated at one end to axle 47 and at the other end to a crossmember 59 of frame 11.

Figure 5:
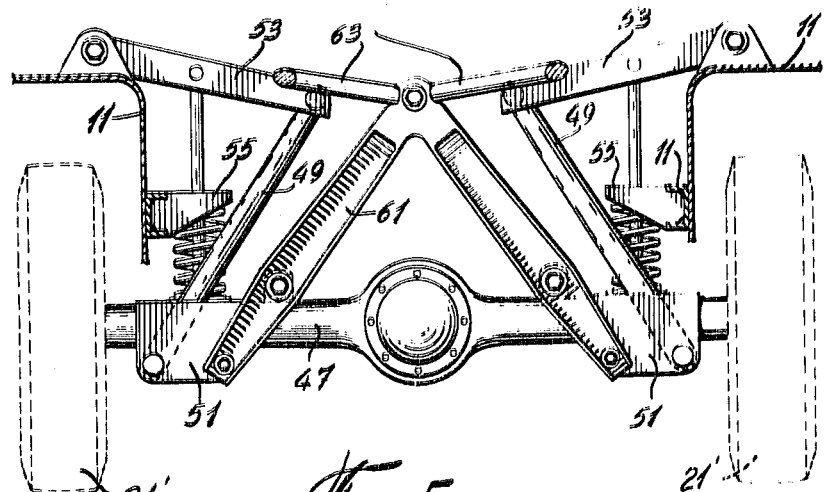
FIG. 5 is a transverse cross-sectional view, looking forwardly, of the rear suspension according to the invention and along line 5—5 of FIG. 6.
Figure 6:
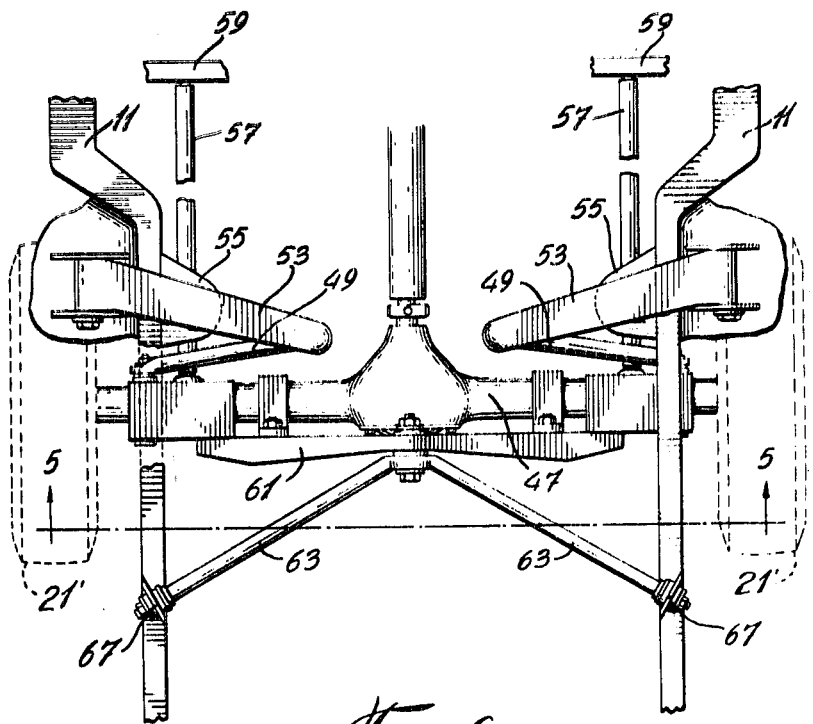
FIG. 6 is a plan view of the rear suspension according to the invention.

The rear suspension includes means for restraining the lateral rocking of the rear end of the body, this restraining means to comprise a transverse angular or A-member 61, having an apex at the top and fixed, at the lower end, to brackets 51 and axle 47 in any convenient manner such as that shown in FIGS. 5 and 6. This restraining means further includes a V-shaped restraining element 63 centrally articulated to the apex of A-member 61 and also articulated to frame 11, preferably through brackets 67 upstanding from frame channels 11. It will also be understood that restraining element 63 may be formed by two distinct rods each articulated to the upstanding frame 61. A-member 61 and V-element 63 take care of axle torque and lateral body stability.

Returning again to the front suspension illustrated in FIGS. 1 to 4, it is obvious that the amount of banking of the uprights 1, and consequently of the wheels 21, will depend on the relative length of the upper and lower banking levers 23 and 27. Generally, the shorter the lower levers 27 are and the longer the upper levers 23 are, the greater will the banking be. The exact ratio will of course depend on many factors such as the locations of the levers 23 and 27 from the respective ends of the supporting struts 9, the amount of wheel banking desired, etc.

I claim:

1. In an automobile having a body and a pair of upright means each including an upright and each mounted on one side of said body with a wheel mounted thereon for rotation, the improvement in the combination comprising:
   a. a body frame including a radiator support yoke at the front end thereof;
   b. a torsion rod assembly mounted on said yoke transversely thereof and comprising:
      two aligned tubes mounted on said yoke for rotation about their longitudinal axes;
      a torsion rod loosely mounted in said tubes and fixed to the bottom ends thereof;
   c. a supporting assembly comprising:
      supporting struts each on one side of said body to which the front end of said body is suspended, said struts being inclined toward one another and being of a length to allow suspension of said body above the center of gravity thereof whereby to cause said body to rock about a substantially longitudinal axis when said automobile takes on a curve;
      a pair of trailing arms articulated at the rear end thereof to the top of said supporting struts and fixed at the forward end thereof each to one of said tubes;
      means interconnecting said struts and said uprights, and
   d. a pair of shock absorber units connected respectively to said body and to said supporting assembly whereby to transfer the weight of said body to the top of said uprights.

2. An improvement as claimed in claim 1 wherein the lower end of said uprights are interconnected by an axle and further including locating arms connected at the ends thereof to the top of one of said uprights and to the top of said yoke and also including radius rods articulated at the ends thereof to said axle adjacent said uprights and to the bottom of said yoke.

3. An improvement as claimed in claim 1 wherein said means interconnecting said struts and said uprights comprises first articulated connections on one side of each strut interconnecting the top of said strut and the top of the corresponding upright, and further including second articulated connections on the sides of said struts opposite that of said first connections and interconnecting the lower end of said struts and said body at the bottom thereof whereby when said body rocks about said longitudinal axis, said second articulated connections cause said struts to rotate and said first articulated connections force said uprights and wheels to bank toward the center of the curve.

4. An improvement as claimed in claim 3 wherein said first articulated connections comprise upper banking levers solid with and laterally projecting from the top of said struts and upper banking arms articulated at one end to the free ends of said upper levers and articulated at the other end to the top of said uprights ans wherein said second articulated connections comprise lower banking levers solid with and laterally projecting from the lower end of said struts in a direction opposite that of said banking levers and lower banking arms articulated at one end to the free ends of said lower levers and articulated at the other end to the bottom of said body.

5. An improvement as claimed in claim 4 wherein said lower banking arms are articulated substantially to the longitudinal center of said body.

6. An improvement as claimed in claim 1 wherein said automobile has a rear axle and a pair of rear wheels mounted on said axle, and including a rear suspension for said body, comprising:

supporting struts pivoted to said axle at one end thereof adjacent said wheels; said struts inclined toward one another for the suspension of said body above the center of gravity thereof constructed to cause said body to rock about a substantially central longitudinal axis thereof when said automobile takes on a curve;

a supporting arm, for each strut, pivoted at one end to said body and at the other end to the top of said strut;

a pair of vertically extending shock absorber units pivoted to said body and to said supporting arms.

7. An improvement as claimed in claim 6 including means for restraining lateral rocking of said rear end of said body and comprising:

a transverse frame fixed to and upstanding from said rear axle;

a pair of rearwardly directed restraining elements articulated to said frame on either side thereof respectively and to the center of said transverse frame.